United States Patent

[11] 3,590,836

| [72] | Inventors | Ernst Kuntze<br>Hamburg-Wellingsbuttel;<br>Wilhelm Zander, Wendentorwall; Bernd<br>Zander, Eichenweg, all of, Germany |
|---|---|---|
| [21] | Appl. No. | 762,524 |
| [22] | Filed | Sept. 25, 1968 |
| [45] | Patented | July 6, 1971 |
| [73] | Assignee | Firma Dr.-Ing. W. Zander, Gesellschaft fur<br>Rein-und Abwassertechnik m.b.H.<br>Wendentorwall, Germany |
| [32] | Priority | Dec. 10, 1965, Mar. 16, 1966 |
| [33] |  | Germany |
| [31] |  | Z 11915 and Z 12099 |

[54] SEWERAGE TRANSMISSION SYSTEM
8 Claims, 4 Drawing Figs.

[52] U.S. Cl. ..................................................... 137/12,
137/209, 137/240, 4/1, 302/27
[51] Int. Cl. ...................................................... F17d 1/12,
B65g 53/00
[50] Field of Search............................................ 137/209;
4/1; 137/8, 12; 302/27; 103/234; 210/15; 137/14,
240

[56] References Cited
UNITED STATES PATENTS

| 2,958,333 | 11/1960 | Poettmann .................... | 137/8 X |
| 3,049,489 | 8/1962 | Ciabattari..................... | 103/234 X |
| 3,085,831 | 4/1963 | Mylting ........................ | 302/27 |
| 3,115,148 | 12/1963 | Liljendall ..................... | 137/209 X |

Primary Examiner—Alan Cohan
Attorney—Dirk J. Veneman

ABSTRACT: A series of controlled discharge collection stations are linked to a central sewerage transmission pipe, having a relatively small diameter, with conduits pressurized in part with air to create turbulence and minimize settlement within the pipe.

SEWERAGE TRANSMISSION SYSTEM

This is a continuation-in-part application to U.S. Ser. No. 600,632, filed Dec. 9, 1966 entitled "Sewerage Transmission System" and now abandoned.

BACKGROUND OF THE INVENTION

The present invention relates to a fluid transmission system in which deposits are conveyed by the fluid, and, more particularly, to a sewerage system for collecting and conveying waste from individual collection points to a central disposal plant.

The ordinary sewerage transmission system of today comprises a long underground main channel to which a multiplicity of smaller collection channels, or conduits, are joined. The main conduit is usually made up of a series of pipe section, each about 1.5 meters long, adapted to fit together end to end. The diameters of the pipe sections often are relatively large in order to handle the flow volume and for cleaning purposes so diameters are not usually selected below 200 mm. In a system such as this, manholes are provided at intervals of about every 50 meters for the purpose of inspection and cleaning.

In operation, waste deposits and liquid are conveyed to the main conduit under the forces of gravity and entrainment of the conveying fluid such as, for example, the water from a flush toilet. Neither the collection nor main conduits are pressurized; the waste level builds up in the main conduit until enough is accumulated to begin flowing downstream under the force of its own weight.

This type of system, while proving to be satisfactory, has a number of deficiencies:

1. During periods of low waste discharge into the collection conduits, less water is collected in the main conduit to convey the waste deposits. As a result, the fluid flow slows to such an extent that deposits settle to the bottom of the conduit and begin to accumulate and harden.
2. As the diameter of the main conduit increases, the flow velocity of a constant volume of water decreases along with its capacity to entrain the deposits.
3. The deficiencies under 1 and 2 cannot be alleviated by increasing the pitch of the main conduit because of the intolerable depths that would be required as the conduit became longer.
4. In order to handle small flow volumes with a minimum of settling of the deposits, a solid, often expensive, foundation must be provided to support the main conduit so that waste collecting depressions do not occur.
5. In instances where the sewer system must have a relatively large number of abrupt turns, additional expensive manholes for cleaning must be provided because of the greater danger of deposits settling.
6. The possibility of a leak developing between the many sections is rather large so that sometimes foreign surface water in quantities up to 100 percent —300 percent of the waste water volume may enter and overtax the system's capacity.

Up to the present, deficiencies such as those above enumerated could not be easily remedied, if at all. A big problem concerned the inability of a main conduit to function properly when a large number of waste collection points were joined to it. During periods of high volume waste flow from the collection points, the main conduit tended to become impeded and choked with water and deposits. On the other hand, during periods of low volume waste flow, the old problem of deposits settling persisted.

SUMMARY OF THE INVENTION

The problems associated with high and low volume waste flow are obviated with this invention. The volume of fluid flow through the main conduit is monitored continuously by a suitable commercially available measuring device in order that it can be controlled, as explained later.

A feature of this invention is the provision of a flushing means, preferably an air compressor, connected to the main pressure conduit to flush it periodically.

Another feature of the invention is the provision of pressurized flushing means at each individual waste collection point to send waste fluid to the pressurized main conduit through individual pressurized connective conduits.

A third feature of this invention is the provision of individual control devices on each flushing means joined to the main conduit and individual connective conduits. These control devices may be either manually, automatically or program, in the case of a computer application, controlled. In the case of automatic or program control, the individual control devices on the flushing means may be activated by some suitable means such as a pressure switch, which in turn initiates its signal by measuring variations in the flow through the main conduit. The signal may be produced by the actual flow volume or the pressure produced in the main conduit as the fluid flows therethrough.

The advantages of such a system are primarily twofold. During periods of little or no flow volume through the main conduit, the flushing means can force a relatively small volume of fluid through it under high pressure to thoroughly remove any deposits that had settled or are about to settle. During periods of high volume of fluid flow through the main conduit, the measuring device can indicate, in the case of manual operation, or control the time when the individual flushing means can discharge into the main conduit without danger of overburdening its capacity.

The system, therefore seldom if ever functions for prolonged periods of low or slow flow rates. When the system does operate, the main conduit is handling a near capacity volume. This operating characteristic provides the system with the inherent advantage of discouraging the settling of deposits to a degree previously unattainable.

It is an object of this invention to provide a sewerage system which discourages the settling and accumulation of deposits in the conduits and retards putrefaction of sewerage transmitted therein.

Another object of the invention is to provide a sewerage system that requires very few costly access points such as manholes.

Another object of the invention is to provide a sewerage system whose operation is not adversely affected by depressions in its conduits caused by weak, or no ground foundations.

A further object of the invention is to provide a sewerage system which conveys waste fluid with a minimal infusion of fresh water.

A still further object of the invention is to provide a sewerage system that requires a minimum of inspection and cleaning service.

Another object of the invention is to provide a sewerage system wherein the infusion of ground water is largely eliminated, thereby decreasing the amount of total waste fluid that has to be processed in the waste water treatment plant.

DESCRIPTION OF THE PREFERRED EMBODIMENTS

Figure 1:
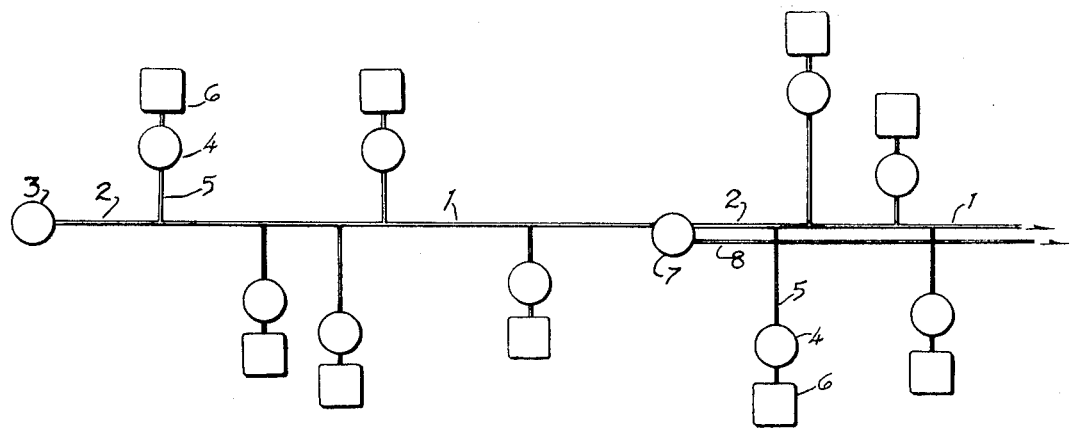
FIG. 1 is a symbolic representation of a plan view of a complete layout showing air compressors, pipes and individual collection tanks.
Figure 2:
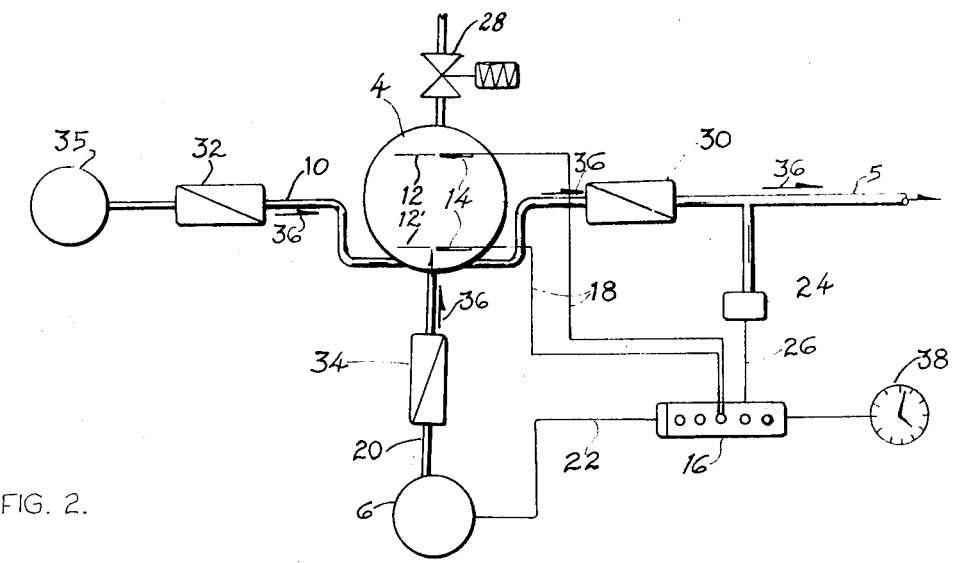
FIG. 2 is a detailed view of an individual waste collection tank showing the connections and controls for compressed air, waste water input and discharge connective conduits leading to the main conduit.

In FIGS. 1 and 2 a waste collection tank 4 receives sewerage through conduit 10, which is connected for example to an individual source of waste material such as a toilet, beneath the liquid surface 12 therein in its lowermost position 12'. A pair of sensing devices 14, such as a buoyant float linked with a switch, are mounted within tank 4, one each near the top and bottom, and are linked electrically with a control console 16 through wires 18.

An air compressor 6 is mounted to discharge into tank 4 beneath surface 12' through conduit 20. Air compressor 6 is controlled from console 16 through a wire 22.

A discharge connective conduit 5, also located beneath the lower liquid surface level 12', links collection tank 4 with the main conduit 1. A pressure switch 24, projecting into conduit 5, is connected to console 16 through wire 26.

Above the liquid surface at its upper level 12, a blowoff valve 28 is mounted on too of tank 4 and is opened to facilitate liquid entry into tank 4.

Within each conduit 5, 10, 20 between collection tank 4 and main conduit 1, the sewerage source, an air compressor 6, respectively, a one-way valve 30, 32, 34 is located to prevent travel by air or liquid in any direction other than that shown by arrows 36. This prevents air and liquid from backing out of collection tank 4 into the air compressor or sewage source 35. It also prevents sewerage expelled from tank 4 into conduit 5 from returning.

In operation, a plurality of collection tanks 4 and air compressors 6 are linked to main conduit 1 through connective conduits 5 as shown in FIG. 1. Sewerage is received into each collection tank 4 through conduit 10 and one-way valve 32 until it reaches the upper level 12 as indicated by sensing device 14. During entry, valve 28 (magnetically operable) is open to reduce back pressure. Pressure maintained on the downstream side of valve 30, by means as explained later, is higher than that providing the pressure head loading tank 4, which is in the range of 2—4 atmospheres, thus preventing unscheduled discharge into conduit 5. When the sewerage reaches the level 12, valve 28 is closed and the signal transmitted to console 16 via wire 18 initiates air compressor 6 which introduces compressed air into the lower end of the tank 4 through one-way valve 34 in conduit 20. The compressed air percolates upwardly through the sewerage and forces discharge through one-way valve 30 and conduit 5 into main conduit 1 as pressure rises above that in conduit 5 downstream of valve 30. It is important to note that only aerated liquid sewerage, not air, is forced to discharge into conduit 5 by virtue of outlet 36 being below the lowermost liquid surface level 12'.

Discharge continues until lower sensing device 14 indicates the sewerage has reached lower level 12' and a signal is transmitted via wire 18 to control console 16 which in turn switches off air compressor 6. Valve 28 is opened and the cycle can start again. The sewerage level within tank 4 always stays between upper and lower sensing devices 14.

Semiautomatic operation may be provided, if desired, by mounting a pressure switch 24 in conduit 5 capable of generating a signal to control console 16 through wire 26 when pressure therein falls below a predetermined limit. This indicates main conduit 1 is not operating at its maximum capacity and the discharge procedure described above, initiated by the control console, will begin again.

In instances where full automatic operation is desirable, such as when the rate of sewage supply to each collection tank 4 is relatively constant, a timer switch 38 is connected to control console 16 to signal control of ingress into tank 4 and discharge through conduit 5 at preset intervals. In this manner, all the individual collection points along the main conduit, each with a tank 4, air compressor 6 and connective conduit 5, could discharge at slightly different times to maintain maximum turbulence and flow therein without overloading the system.

Figure 3:
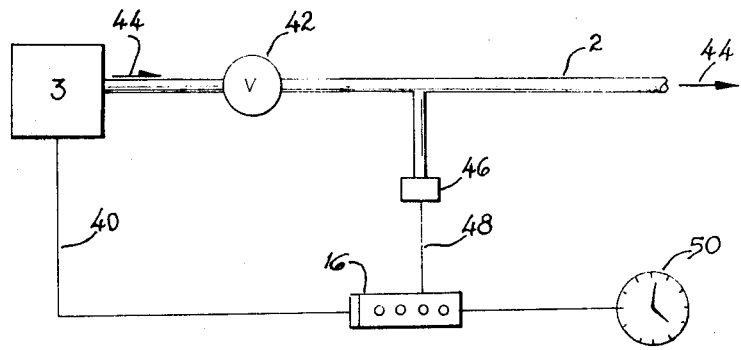
FIG. 3 is a detailed view of the flushing equipment shown at the head end of the layout in FIG. 1 showing an air compressor connected to the rinsing conduit and the controls for regulating its operation.
Figure 4:
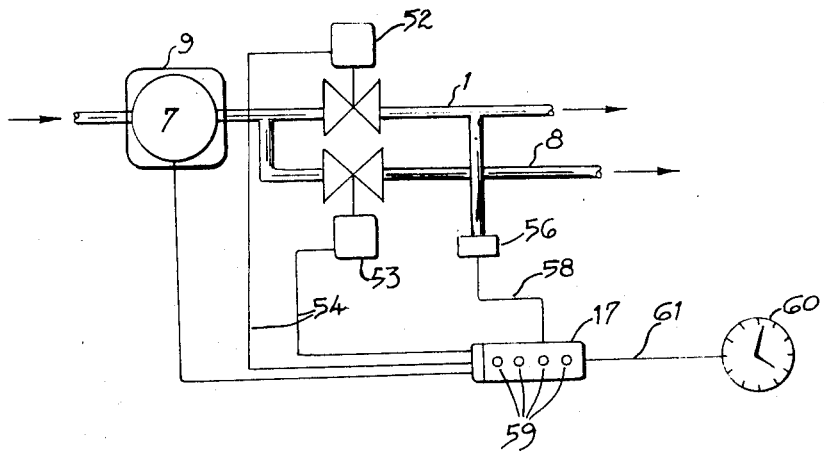
FIG. 4 is a detailed view of the intermediate air compressor and auxiliary conduit used in long systems and also the controls which regulate the use of either conduit.

At the head of main conduit 1, an air compressor 3 is connected via a rinsing conduit 2. At periodic intervals, during normal operation, air compressor 3 is activated to discharge into conduits 2 and 1 to urge sewerage introduced from conduit 5 downstream to a sewage processing plant. As illustrated in FIG. 3, this also can be controlled manually through console 16 via wire 40. Another one-way valve 42 is interposed in conduit 2 between air compressor 3 and conduit 1 to prevent liquid movement upstream against desired direction of movement downstream as indicated by arrow 44.

The use of compressed air to convey sewage from main conduit 1 compliments the air percolated through it within collection tank 4 to retard putrefaction. In addition, it provides a pressure head for conveying the sewerage without adding to the quantity of liquid conveyed downstream.

If desired, semiautomatic control can be provided through the use of a pressure switch 46 connected to rinsing conduit 2, linked with and operated through console 16 through wire 48 in a manner analogous to that described above in connection with pressure switch 24 linked to conduit 5 and console 16. Falling pressure reactivates compressor 3.

Also in a manner analogous to the automatic control described in conjunction with the collection tank 4 in FIG. 2, a timer 50 may be connected to console 16 to provide automatic control of air pressure 3 instead of manual or semiautomatic control. Timer 50, then, would signal compressor 3 to discharge at predetermined intervals to convey sewerage downstream in conduit 1.

In the system described, discharge from individual collection tanks 4 is permitted when they are full and/or the liquid volume in main conduit 1 is below predetermined limits as indicated by pressure switches 24,46.

In applications where the main conduit is longer than about 5 miles, it might become necessary to provide an auxiliary main pressure conduit 8 with an intermediate storage tank 9, which may be optional, and an auxiliary air pump 7 to handle the accumulated sewerage from all the collection tanks 4 upstream and maintain a flow rate sufficient to prevent settlement in conduits 1 and 8.

If an auxiliary main conduit 8 is used, sewerage received from conduit 1 can be either fed directly past air pump 7 or into an intermediate sump or storage tank 9 for temporary storage. Pump 7 is preferably an air compressor but, in some applications might be a liquid pump; in either case, it provides additional pressure downstream in conduits 1 and 8, as desired.

Downstream of auxiliary air pump 7, auxiliary main conduit 8 joins conduit 1. An electrically operable valve 52,53 is mounted within each conduit 1 and 8, respectfully, with their control wires 54 connected to a control console 17. Manual control of either or both valves can be effected by pushbutton control 59 from the console.

Sewerage from individual sources and collection tanks 4 always discharges into main conduit 1, even downstream of auxiliary pump 7, so auxiliary conduit 8 does not accumulate sewerage.

For semiautomatic control, a pressure switch 56 is attached to main conduit 1 and linked electrically to control console 17 through wire 58. At pressure above a preset level, switch 56 signals console 17 to open the valve 53 to allow entry into auxiliary conduit 8 to relieve the load in the main conduit 1. When the pressure falls to a lower predetermined limit, switch 56 signals console 17 again and valve 53 is closed.

Operation of air pump 7 is controlled manually by monitoring an ordinary pressure gauge (not shown) connected to conduit 1 downstream. When both conduits 1 and 8 have been in operation and the load has decreased to a point where auxiliary conduit 8 is no longer needed, valve 52 in conduit 1 is closed briefly and pump 7 activated to clear out conduit 8. Valve 53 is then closed and valve 52 opened and normal operation is resumed.

Automatic operation of valves 52,53 can be provided, if desired, by linking a timer switch 60 to control console 17 through wire 61. A three step timed sequence, for example, is automatically programmed wherein (1) conduit 1 is opened and conduit 8 closed, (2) both conduits are open, (3) conduit 1 is closed and conduit 8 is open. Conduit 1 is then opened and regular operation resumed.

It has been found that compressed air, in combination with the waste fluid discharged from collection tanks 4, is superior to water alone for cleaning main pressure conduit 1 because of the extremely turbulent action of the compressed air and waste fluid mixture. Several features inherent in a system utilizing compressed air which are not available when water alone is used as a conveying medium are:

1. The total volume of waste fluid conveyed through main conduit 1 is not increased unnecessarily by additional quantities of rinse water.
2. The cost of making rinse (fresh) water available is eliminated.
3. The oxygen in the pipes enriches the waste. This is particularly important during periods of slow flow speed through the conduits because the waste may then be partially digested by the time it reaches the waste water treatment plant. At the plant, digestion can frequently be achieved only after considerable difficulty.

It will be appreciated that this system allows a relatively small diameter main conduit to handle a comparatively high volume at near complete capacity continuously as opposed to prior sewerage systems which use much larger pipes to handle larger peak loads intermittently due to a lack of coordinated discharge from collection tanks and the use of water alone as a flushing medium.

As an example of various parameters that might be utilized in a system incorporating the principles taught in this invention, the following could be considered typical: pressure values in the conduits range from 0—4 atm (gauge pressure in atmospheres); diameter of conduit 1: 100—200 mm.; diameter of conduit 2: 25—100 mm.; diameter of conduit 5: 80—100 mm.; and the diameter of conduit 8: above 100 mm.

Thus it will be seen that an improved waste water transmission system has been provided which achieves the objects and advantages set forth and overcomes the disadvantages associated with prior such systems thereby obtaining a result heretofore unobtainable.

The drawing and specification present a detailed disclosure of the preferred embodiments of the invention, and it is to be understood that the invention is not limited to the specific form disclosed, but covers all modifications, changes and alternative constructions and methods falling within the scope of the principles taught.

We claim as our invention:

1. Apparatus for the conveyance of waste matter comprising:
   a main pressure conduit for waste collection and transmission;
   at least one waste collection point;
   a connective pressure conduit operatively joining each said waste collection point with said main pressure conduit;
   first flushing means to supply fluid under pressure at selected time intervals to said main pressure conduit to convey said waste matter through said main pressure conduit;
   and a second flushing means to supply fluid under pressure to each said connective pressure conduit to convey said waste matter in each said connective pressure conduit to said main pressure conduit,
   an auxiliary main pressure conduit linked in fluid communication to said main conduit;
   first and second valve means within said main and auxiliary pressure conduits, respectively;
   third flushing means in fluid communication with said main pressure conduit upstream of the connection with said auxiliary main conduit;
   control console means operatively connected with said third flushing means;
   pressure switch means operatively connected with said main conduit downstream of the connection with said auxiliary main conduit and connected with said control console means to open and close said first and second valve means and activate said third flushing means according to changes in the fluid volume of waste matter measured within the main conduit.

2. Apparatus for the conveyance of waste matter as set forth in claim 1, wherein:
   said first, second and third flushing means to supply fluid under pressure are air compressors.

3. Apparatus for conveyance of sewage waste containing both solid and liquid matter comprising:
   a main pressure conduit for sewage waste collection and for transmission of the solid and liquid sewage matter to a distant central location,
   a plurality of waste collection stations for receiving the sewage waste,
   a connective pressure conduit connecting each said waste collection station to the main pressure conduit,
   a valve means in each said connective pressure conduit between its respective collecting station and said main pressure conduit to permit the sewage waste to flow only in the direction from the collection station to the main pressure conduit,
   means for supplying compressed air to the sewage waste at the collecting station to (a) convey sewage waste from the collection station through the said valve and into the main pressure conduit and (b) build up sufficient pressure in the main pressure conduit to convey the said sewage waste received from the collection station along the main pressure conduit towards said central location during times when the said valve is open and sewage waste is being conveyed into the main pressure conduit,
   sensing means for sensing the flow rate of sewage waste in the main pressure conduit,
   and flushing means separate from said waste collection stations for introducing only flushing fluids free of waste matter under pressure into the main pressure conduit, said flushing means being operable, in response to the sensing by the sensing means of a low flow rate insufficient to cause waste material to be conveyed along the main pressure conduit, to flush the main pressure conduit to transport sewage waste along the main pressure conduit and to prevent an accumulation of solid sewage waste matter in the main pressure conduit, whereby the flushing means cleans and transports waste in the main pressure conduit when the normal conveying pressure, that is the pressure derived from the compressed air at the collection stations and operable only when waste is being transmitted from that collection station into the main pressure conduit, is at a low level of operation.

4. An apparatus for conveyance of sewage waste matter according to claim 3, wherein each of said flushing means and said means for supplying compressed air to the sewage waste includes an air compressor, and further including control console means operatively connected to said air compressors, sensing means within said waste collection stations and linked with, and capable of activating the air compressor in the collection stations through said control console means according to the quantity of fluid within each collection station.

5. An apparatus for the conveyance of waste matter according to claim 3 wherein the sensing means is a pressure switch operatively connected to the main pressure conduit to measure the pressure therein, wherein the pressure is proportional to the flow rate of the sewage waste matter in the main pressure conduit.

6. A method for conveying sewage waste containing both solids and liquid matter comprising the steps of:
   collecting sewage waste at a plurality of waste collecting stations which are each connected to a main pressure conduit through a connective pressure conduit in which is located a valve which permits waste to flow only in the direction from the collection stations to the main pressure conduit, pressurizing the waste at the collecting stations by introducing compressed air into said sewage waste, conveying the sewage waste through the connective pressure conduits through said valve and into the main pressure conduit by further introduction of pressurized air into the sewage waste in the collection stations, conveying the sewage waste along the main pressure conduit under the force of the pressure of the compressed air derived at the collection stations, said air being transmitted through the connective pressure conduits to the main pressure conduit as the waste is being transmitted along said connective pressure conduits into the main pressure conduit, and, during periods when the volume of sewage waste transmitted from the collection stations through the connective pressure conduits is sufficiently low that the pressure force transmitted from the collection stations through the connective pressure conduits to the main pressure conduit is insufficient to cause movement of sewage waste along the main pressure conduit, flushing the main pressure conduit with a source of pressurized fluid separate from that received from the collection stations to transport the sewage waste along the main pressure conduit and to prevent an accumulation of solid waste matter in the main pressure conduit.

7. The method of claim 6 including measuring the flow rate of sewage waste in said main pressure conduit, controlling the time interval of sewage waste discharge from each of a plurality of said waste collection stations into said main pressure conduit through said connective pressure conduits so as to not exceed a predetermined measurement of flow rate of sewage waste in said main pressure conduit, and introducing said pressurized flushing fluid into said main pressure conduit during periods of a predetermined low measurement of sewage waste in said main pressure conduit so as to substantially empty said main pressure conduit.

8. The method of claim 6 including measuring the flow rate of sewage waste in said main pressure conduit, controlling the timed interval of sewage waste discharge from each of a plurality of said waste collection stations into said main pressure conduit through said connective pressure conduits so as to not exceed a predetermined measurement of flow rate of sewage waste in said main pressure conduit, introducing compressed air below the fluid level of each of said waste collection points to entrain, oxidize and convey said waste material through said connective pressure conduits into said main pressure conduit, and introducing compressed air as the said flushing fluid into said main pressure conduit at intervals in time corresponding to specified high and low waste flow periods, as determined by the said measurement, in order to clean the said main pressure conduit of settled solid sewage material and to convey said sewage waste material downstream therein.